(12) United States Patent
Merchant et al.

(10) Patent No.: US 11,135,947 B2
(45) Date of Patent: Oct. 5, 2021

(54) VEHICLE SEAT

(71) Applicant: Adient Engineering and IP GmbH, Burscheid (DE)

(72) Inventors: Walter Daniel Merchant, Rochester Hills, MI (US); Keith R. Ziegler, Westland, MI (US); Emery Jay Zadina, Ypsilanti, MI (US)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 111 days.

(21) Appl. No.: 16/677,176

(22) Filed: Nov. 7, 2019

(65) Prior Publication Data

US 2020/0070690 A1 Mar. 5, 2020

Related U.S. Application Data

(62) Division of application No. 15/793,259, filed on Oct. 25, 2017, now abandoned.

(51) Int. Cl.
| | |
|---|---|
| *B60N 2/60* | (2006.01) |
| *B60N 2/20* | (2006.01) |
| *B60N 2/30* | (2006.01) |
| *B60N 2/68* | (2006.01) |
| *B60N 2/02* | (2006.01) |
| *B60N 2/66* | (2006.01) |
| *A47C 7/46* | (2006.01) |
| *B60N 2/22* | (2006.01) |

(52) U.S. Cl.
CPC ............ *B60N 2/20* (2013.01); *B60N 2/3047* (2013.01); *B60N 2/68* (2013.01); *A47C 7/46* (2013.01); *A47C 7/462* (2013.01); *A47C 7/467* (2013.01); *B60N 2/2222* (2013.01); *B60N 2/66* (2013.01); *B60N 2/666* (2015.04); *B60N 2/667* (2015.04); *B60N 2002/0236* (2013.01)

(58) Field of Classification Search
CPC .......... B60N 2/66; B60N 2/2222; B60N 2/20; B60N 2/3047; B60N 2/68; B60N 2/666; B60N 2/667; A47C 7/462; A47C 7/467; A47C 7/46
See application file for complete search history.

(56) References Cited

U.S. PATENT DOCUMENTS

| | | | | |
|---|---|---|---|---|
| 4,159,847 A | * | 7/1979 | Arai | B60N 2/667 297/284.4 |
| 5,087,098 A | * | 2/1992 | Ishizuka | A47C 7/462 297/284.4 |
| 7,559,594 B2 | * | 7/2009 | McMillen | B60N 2/206 296/65.09 |
| 7,669,928 B2 | * | 3/2010 | Snyder | B60N 2/62 297/284.11 |
| 8,449,012 B2 | | 5/2013 | Siebold et al. | |

(Continued)

*Primary Examiner* — Syed A Islam
(74) *Attorney, Agent, or Firm* — Marshall & Melhorn, LLC

(57) ABSTRACT

A vehicle seat includes a seat back frame with an upper subframe pivot. A seat back subframe is pivotably connected to the seat back frame at the upper subframe pivot. An actuation assembly pivotably moves the seat back subframe relative to the seat back frame about the upper subframe pivot, between a seat back subframe design position and a subframe recline position. In the recline position a lower edge of the seat back subframe is positioned outwardly relative to the seat back frame with the seat back subframe pivoted to an angle relative to the seat back frame.

19 Claims, 8 Drawing Sheets

(56) References Cited

U.S. PATENT DOCUMENTS

| | | |
|---|---|---|
| 9,308,836 B2 | 4/2016 | Hausler et al. |
| 9,919,626 B2 | 3/2018 | Goodhall et al. |
| 2007/0228790 A1 | 10/2007 | Schurg et al. |

* cited by examiner

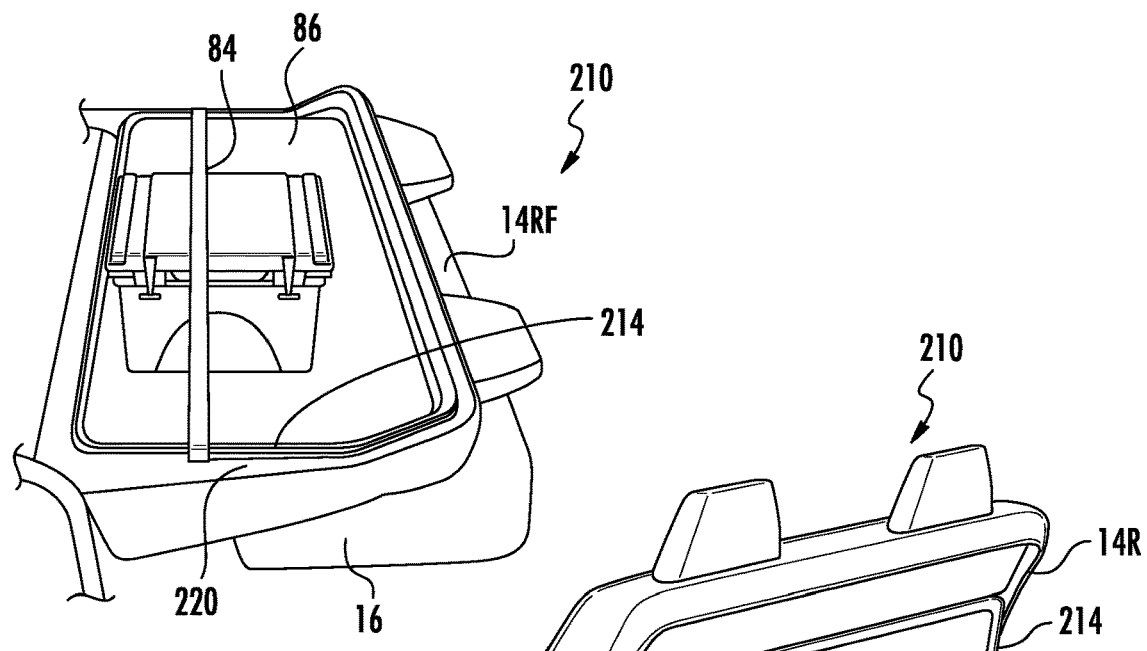
FIG. 15
FIG. 16
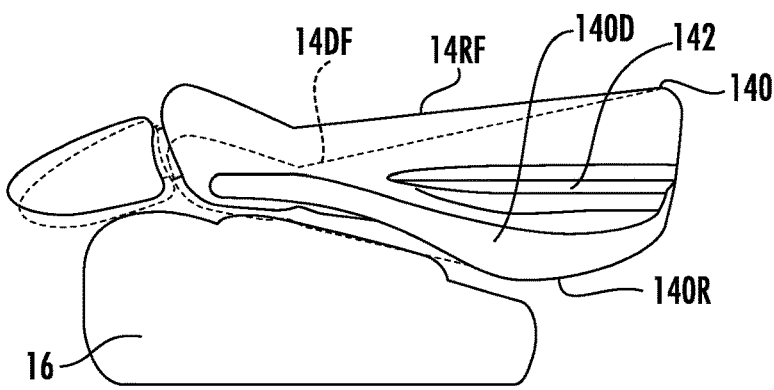
FIG. 17
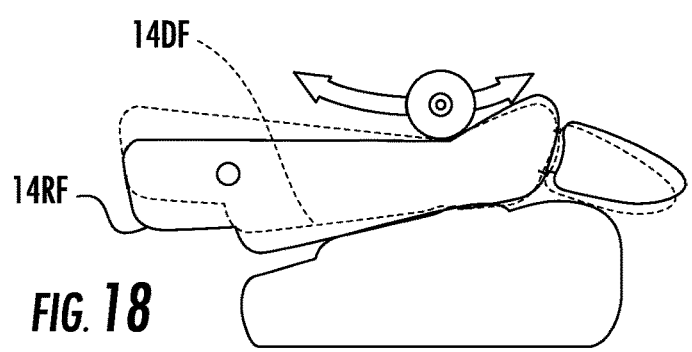
FIG. 18

VEHICLE SEAT

CROSS REFERENCE TO RELATED APPLICATION

This is a divisional application of pending U.S. application Ser. No. 15/793,259, filed on Oct. 25, 2017, the entire contents of which are incorporated herein by reference.

TECHNICAL FIELD

The present invention relates to vehicle seats and more particularly relates to a vehicle seat with the seat back (backrest) which can be angled to a reclined angular position (a recline position) unrestricted by a rearward vehicle body/bulkhead.

TECHNICAL BACKGROUND

Vehicle seats may be provided that include a seat back that pivots forward relative to a vehicle seat base (cushion). The forward pivoting of the seat back may be for stowage or for easy entry behind the vehicle seat. Vehicle seats may include a seat back reclining feature in which the seat back can be pivoted from a design position (a use position) to recline positions. Particularly with a pickup truck environment a rear vehicle seat may have limited clearance between the back of the seat back and the vehicle body/bulkhead. This limits the ability of the seat back of the rearmost seat to recline.

Slouch seats have been provided which support the seat base and the seat back such that the seat back and the seat base can move from a design position, with the seat back closer to vertical, to a recline positions, with the seat back at more of a recline angle relative to vertical. The change in angle of the seat back is accompanied with movement of the seat base. In particular, the front edge of the seat base moves forward as a lower portion of the seat back moves forward and an upper portion of the seat back moves lower. Such slouch seats, as a rearmost seat, do not require clearance between the vehicle body/bulkhead and the seat back for the backrest to recline. However, slouch seats have more complicated mechanisms which may limit the ability of the seat back to pivot forward, for storage above the seat back or for storage or easy entry or access behind the seat back. Complicated mechanisms for slouch seats may also limit the ability of the seat base to pivot up to a stadium position for storage and access.

Vehicle seats may be provided that include a seat back that pivots forward relative to a seat cushion for stowage above the back of the seat back (load floor storage). This may be provided with a pivoting movement of the seat back and may also include a tilting movement of the seat base (cushion), such that the seat back can lie horizontally or more nearly horizontally. However, this added movement of the seat base requires more complicated mechanisms that may require extensive clearance between the back of the seat back and the vehicle body/bulkhead.

SUMMARY

It is an object of the invention to provide a vehicle seat which includes a seat back which reclines based on a pivot towards a top of the seat back and which does not require clearance between the vehicle body/bulkhead and the seat back, with the vehicle seat as a rearmost seat.

It is a further object of the invention to provide a vehicle seat with such a seat back as noted above and with the ability of the seat back to pivot forward, for storage above the seat back or for storage, easy entry or access behind the seat back and/or with the ability of the seat base to pivot up into a stadium position, for easy entry, for access or for storage.

It is a further object of the invention to provide a vehicle seat with such a seat back as noted above and with the vehicle seat in a slouch position or at least with the seat back in a recline/slouch position and also folded flat, whereby the back (rear surface or load floor) of the seat back is parallel or more nearly parallel to the floor of the vehicle, thus creating a parallel load floor.

According to the invention, a vehicle seat is provided comprising a seat back frame, with an upper subframe pivot, and a seat back subframe that is pivotably connected to the seat back frame at the upper subframe pivot. The seat also provides an actuation assembly that pivotably moves the seat back subframe relative to the seat back frame about the upper subframe pivot, between a seat back subframe design position and a subframe recline position. The recline position has a lower edge of the seat back subframe that is positioned outwardly relative to the seat back frame with the seat back subframe pivoted to an angle relative to the seat back frame.

The actuation assembly may advantageously comprise an actuator drive and an actuator drive to seat back subframe pivot movement transmission. The pivot movement transmission transfers motion of the actuator drive to pivoting movement of the seat back subframe.

The actuator drive may advantageously comprise an actuation lever connected to the seat back subframe and rotatable about a drive axis. Additionally, the actuator drive to seat back subframe pivot transmission may comprise a pivot lever connected to the seat back subframe and rotatable by the actuation lever about the drive axis and a cam with a cam slot, the cam being connected to one of the pivot lever and the seat back subframe. A cam follower may be connected to another of the pivot lever and the seat back subframe. The cam follower moves along the cam slot between a cam design position and a cam subframe recline position. The lower edge of the seat back subframe is moved outwardly relative to the seat back frame as the cam follower moves along the cam slot between a cam design position and a cam subframe recline position.

The actuator drive may advantageously comprise a drive motor. The actuator drive to seat back subframe pivot transmission may comprise a pivot lever connected to the seat back subframe and rotatable by the drive motor about the drive axis and a cam with a cam slot. The cam is connected to one of the pivot lever and the seat back subframe and a cam follower is connected to another of the pivot lever and the seat back subframe. The cam follower moves along the cam slot between a cam design position and a cam subframe recline position. The lower edge of the seat back subframe is moved outwardly relative to the seat back frame as the cam follower moves along the cam slot between a cam design position and a cam subframe recline position.

The seat back may be pivotable forward from a design position to a stowage or easy entry position. The seat base may be pivotable rearward from a design position to a stowage or stadium position.

The vehicle seat may further comprise bracket supports for connection of the vehicle seat to at least one of a vehicle rear bulkhead and a vehicle floor. The seat back is pivotably connected to the bracket supports for the pivotable movement forward of the seat back from the design position to the stowage or easy entry position. The seat base is pivotably connected to the bracket supports for the pivotable movement rearward of the seat base from the design position to the stowage or stadium position.

The vehicle seat may further comprise a seat base, wherein the seat back is pivotable forward with the subframe in the subframe recline position to a load floor position. With this configuration an angle of a load floor surface, comprised of a rear surface of the seat back, is changed relative to angle of a load floor surface with the subframe in the subframe design position and the seat back in the load floor position.

The vehicle seat according to the invention may be supported at a vehicle floor. In the alternative, the vehicle seat may be supported at a vehicle bulkhead. Further, the vehicle seat may be supported at a vehicle floor and may be supported at a vehicle bulkhead.

The vehicle seat is advantageously provided with foam and trim covering the seat back frame and the subframe. The trim may comprise an elastic portion, a gusset portion or a pleated portion to allow movement of the subframe relative to the seat back frame within the trim covering the seat back frame and the subframe. This allows an expansion of the volume encompassed by the trim as the subframe is moved from the seat back subframe design position to the seat back subframe recline position According to another aspect of the invention a seat back of a vehicle seat is provided. The seat back comprises a seat back frame with an upper frame pivot and an actuation assembly that pivotably moves the seat back about the upper frame pivot, to move the seat back from a design position to a recline position. According to this embodiment, the actuation assembly may comprise an actuator drive connected to a vehicle bulkhead and connected to the seat back to pivot the seat back about the upper frame pivot and move the seat back relative to the vehicle bulkhead. In the alternative, the actuation assembly may comprise an actuator drive connected to a backrest support shaft at the upper frame pivot to pivot the support shaft and to pivot the seat back about the upper frame pivot and move the seat back relative to the vehicle bulkhead. A seat base may be connected to the seat back wherein the seat base moves with the seat back as the seat back pivots about the upper frame pivot and move the seat back relative to the vehicle bulkhead. This embodiment allows the seat back and the seat base to be supported at the upper frame pivot without an further support below the seat base.

According to still another aspect of the invention, a vehicle seat back assembly is provided comprising a seat back frame with an upper subframe pivot and a seat back subframe pivotably connected to the seat back frame at the upper subframe pivot. The vehicle seat back assembly further includes an actuation assembly pivotably moving the seat back subframe relative to the seat back frame about the upper subframe pivot between a seat back subframe design position and a subframe recline position wherein in the recline position a lower edge of the seat back subframe is positioned outwardly relative to the seat back frame with the seat back subframe pivoted to an angle relative to the seat back frame.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 15 is a schematic side perspective view showing a vehicle seat slightly modified from the vehicle seat according to FIG. 1 with the seat back pivoted forward (lie flat position) and in the slouch/recline position with back of the seat back providing a raised load floor and with a cargo strap that retracts for stowage of the cargo strap and can be used to secure items at the raised load floor;

FIG. 16 is a schematic right rear perspective view showing the vehicle seat according to FIG. 16 with the seat back upright and in the slouch/recline position;

FIG. 17 is a side schematic view showing the vehicle seat according to FIG. 1 with the seat back folded forward and in the slouch/recline position to provide a more horizontal (parallel to the vehicle floor) position and showing the vehicle seat with trim (covering); and FIG. 18 is a side schematic view of the vehicle seat according to FIG. 1 showing the disposition of the seat back both with the seat back in the design position and in the slouch/recline position, in which the back surface of the seat back is more nearly horizontal and showing the vehicle seat with trim (covering).

DESCRIPTION OF PREFERRED EMBODIMENTS

Figure 1:
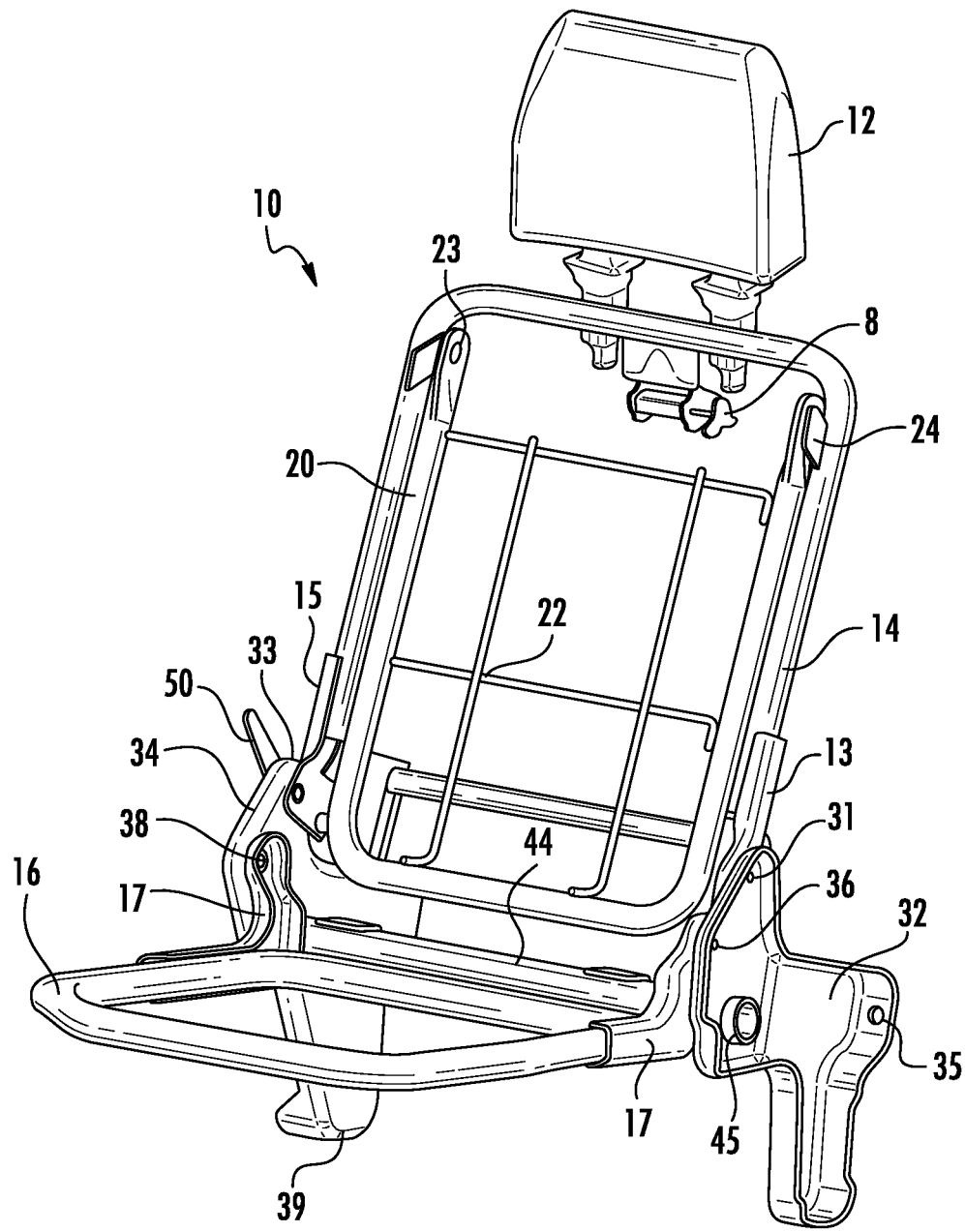
FIG. 1 is a perspective view showing the left front of a vehicle seat according to an embodiment.

Referring to the drawings, FIG. 1 shows a vehicle seat generally designated 10. The vehicle seat 10 includes a headrest 12 that is connected to a seat back frame 14. The vehicle seat 10 also includes a seat base frame 16. The vehicle seat may be a driver seat or a passenger seat or any other vehicle seat type. The vehicle seat 10 is particularly a pick up truck rearmost seat. The vehicle seat 10 is particularly useful in situations in which the space behind the seat is limited, so as to restrict a pivot range of a standard pivotable reclining seat back.

Figure 2:
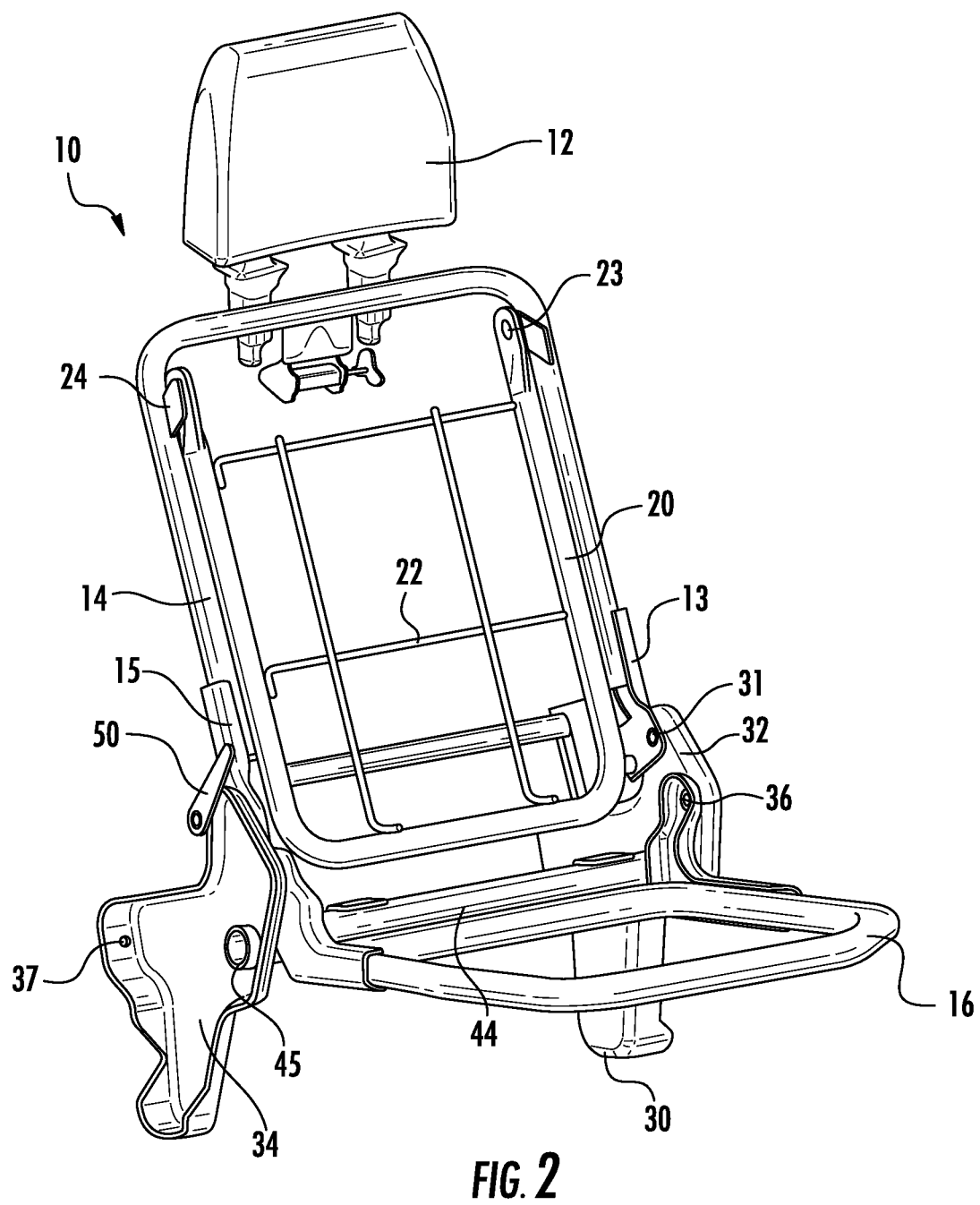
FIG. 2 is a perspective view showing the right front of the vehicle seat according to FIG. 1.
Figure 4:
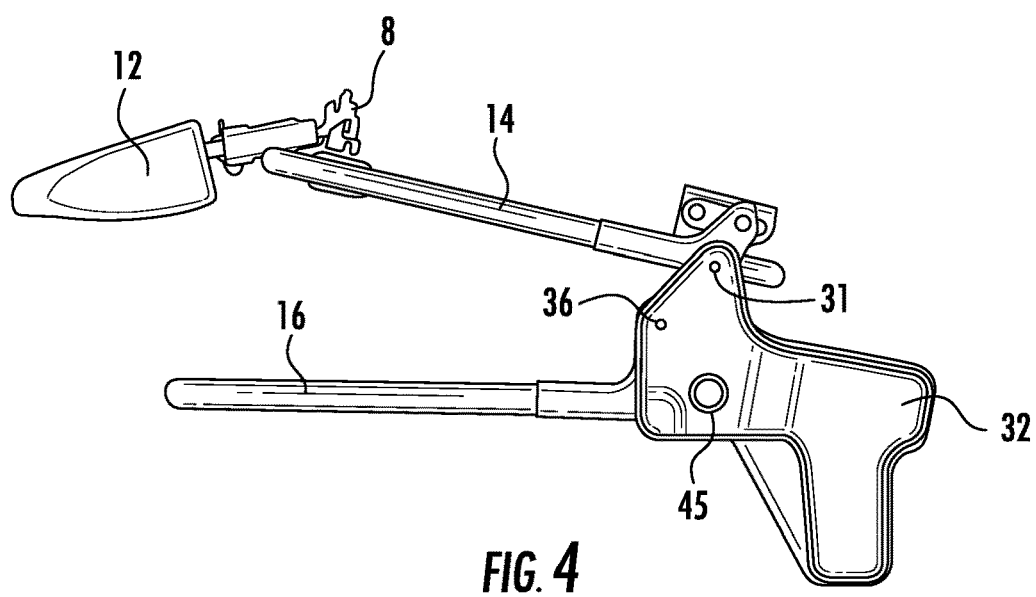
FIG. 4 is a side view showing the right side of the vehicle seat according to FIG. 1 with the seat base frame in the design position and with a seat back pivoted forward to an easy entry or storage position.
Figure 6:
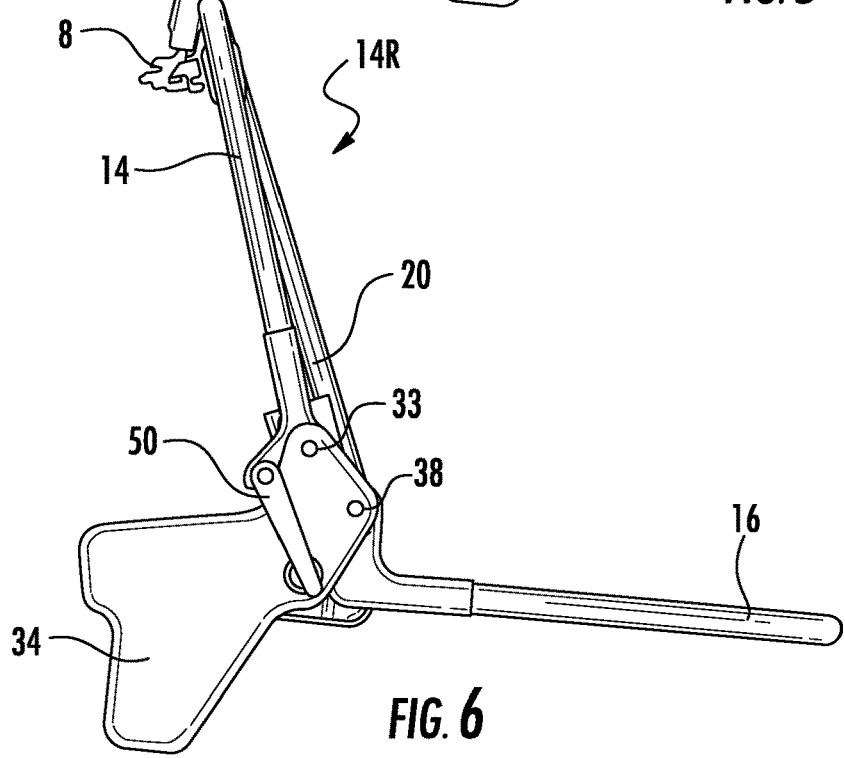
FIG. 6 is a side view showing the right side of the vehicle seat according to FIG. 1 with the seat back with the seat back subframe in a recline position.

The vehicle seat 10 is described based on the vehicle seat having a front side that is positioned facing in a direction of travel and with left and right sides of the vehicle seat 10, corresponding to the left and right of the person seated in the vehicle seat 10. The seat back frame 14 includes a left side seat back frame end bracket 13 and a right side seat back frame end bracket 15. The end bracket 13 connects the seat back frame 14 pivotably to left support bracket 32 and the end bracket 15 connects the seat back frame 4 pivotably to right support bracket 34. The connections form a left seat back pivot 31 and a right seat back pivot 33. The seat back frame 14 and seat back pivots 31 and 33 allow the seat back frame 14 to pivot forward from the design position as shown in FIGS. 1 and 2 (and also from the slouch/recline position as shown in FIG. 6) to an easy entry or storage position shown in FIG. 4.

Figure 3:
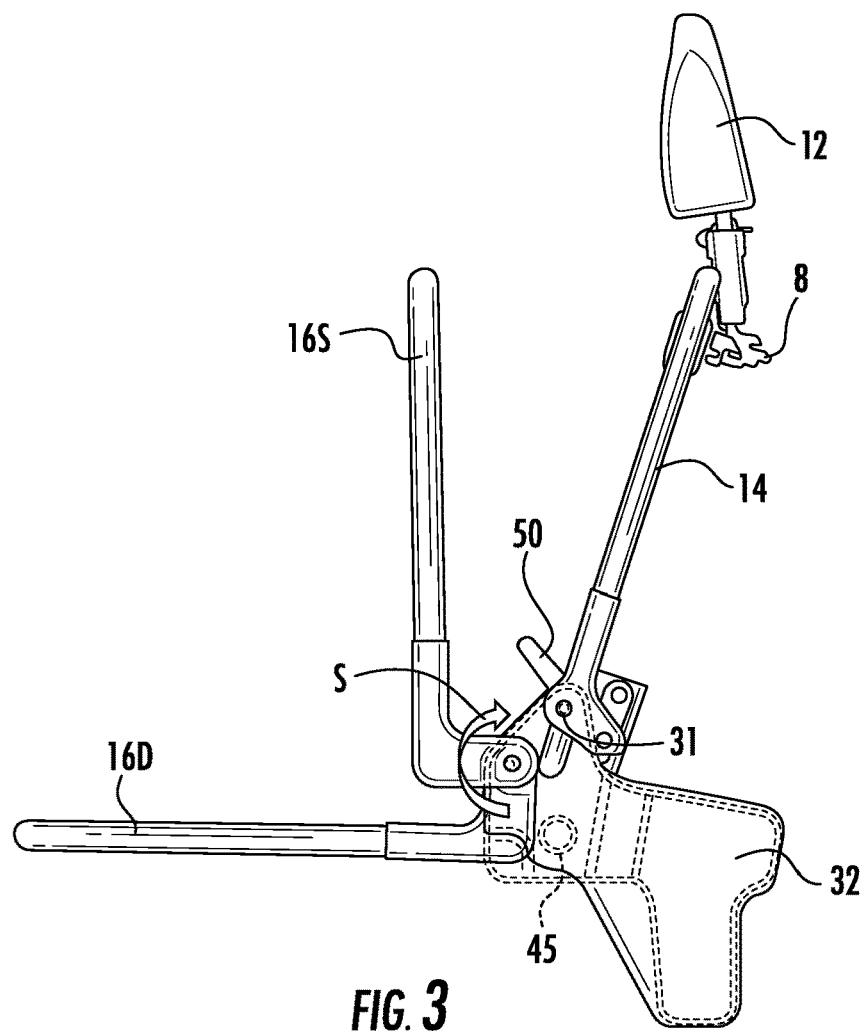
FIG. 3 is a side view showing the left side of the vehicle seat according to FIG. 1 with a seat base (cushion) frame in both a design position and a pivoted up stadium position.

The seat back 14 may be fixed to a vehicle body/bulkhead 4 via a connectable and disconnectable body/bulkhead connection 8. The seat base frame 16 includes seat base pivot brackets 17 that are L-shaped and are each connected to one of the support brackets 32 and 34. The connections form a left side seat base pivot 36 and a right side seat base pivot 38. The seat base pivots 36 and 38 allow the seat base frame 16 to pivot up from the design position shown in FIGS. 1, 2 and at 16D in FIG. 3 to a stadium or stored position 16S as shown in FIG. 3. The seat base frame 16 pivots about the seat base pivots 36 and 38 in the direction of arrow S to move from the design position 16D to the stadium position 16S.

The left side support bracket 32 includes a rear portion forming a left side vehicle body/bulkhead connection 35. The connection 35 allows the left side support bracket 32 to be fixed at the left side vehicle body/bulkhead connection 35 to the vehicle body/bulkhead 4. The right side support bracket 34 includes a rear portion forming a right side vehicle body/bulkhead connection 37. The connection 37 allows the right side support bracket 34 to be fixed at the vehicle body/bulkhead connection 37 to the vehicle body/bulkhead 4. The left side support bracket 32 includes a floor engagement foot 30 that rests on the vehicle floor 2 and may be fixed thereto. The right side support bracket 34 includes a floor engagement foot 39 that rests on the vehicle floor 2 and may be fixed thereto. The left side support bracket 32 is connected to the right side support bracket 34 by a horizontal support tube 44 fixed at each support bracket 32, 34 via tube and bracket support connections 45.

Figure 7:
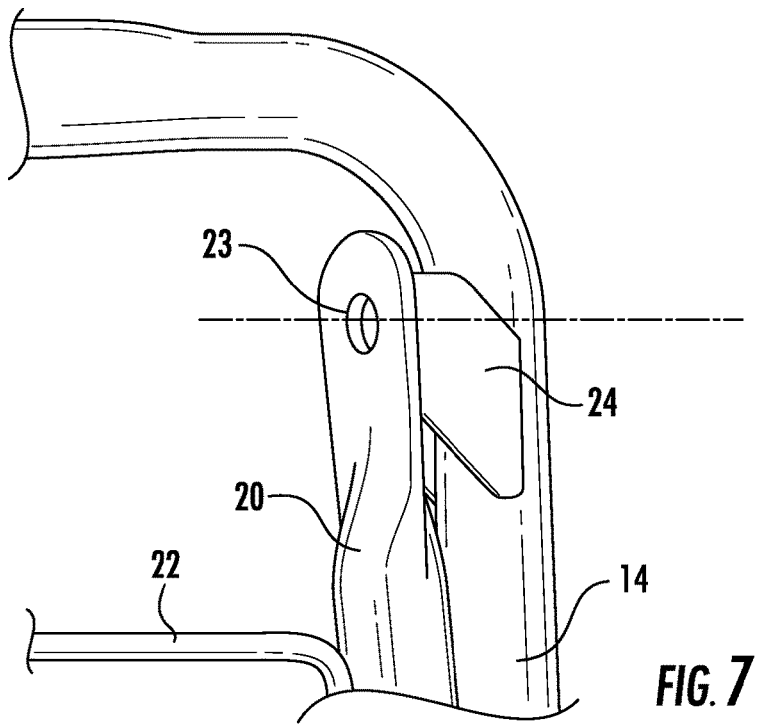
FIG. 7 is a perspective enlarged cutaway view showing a left side pivot bracket and subframe pivot of the vehicle seat according to FIG. 1.

The seat back frame 14 carries with it a seat back subframe 20. The subframe 20 moves with the seat back frame 14 such as for forward pivoting movement of the seat back frame 14 to the pivoted forward position shown in FIG. 4. However, the subframe 20 is also connected to the seat back frame 14 for limited pivoting movement of the subframe 20, relative to the seat back frame 14, about subframe pivots 23. As can be seen in FIGS. 1, 2 and 7 the subframe pivots 23 are provided at an upper location of the seat back frame 14. Subframe pivots 23 are provided by seat back pivot brackets 24, at each of an inner right side and an inner left side of a tube forming the seat back frame 14. The seat back subframe 20 includes a seat back support frame 22 that extends along a lateral or width direction of the vehicle seat 10 between the tubes that form the subframe 20. The seat back support frame 22 may advantageously support foam to support the back of the user of the vehicle seat 10. Trim 140 may be applied to cover the subframe 20 and the seat back frame 14. The sides of the trim may have elastic portions, gussets or pleats 142 that allow for movement of the subframe 20, and movement of foam on top of the support frame 22 as well movement of trim 140 covering the foam at the subframe 22, relative to the seat back frame 14 (FIG. 17). The elastic portions, gussets or pleats 142 allow for an expansion of the volume enclosed by the trim so as to cover both the frame 14 and the subframe 20, both with the subframe 20 in the design position of subframe 20 and the in the slouch/recline position of the subframe 20.

Figure 5:
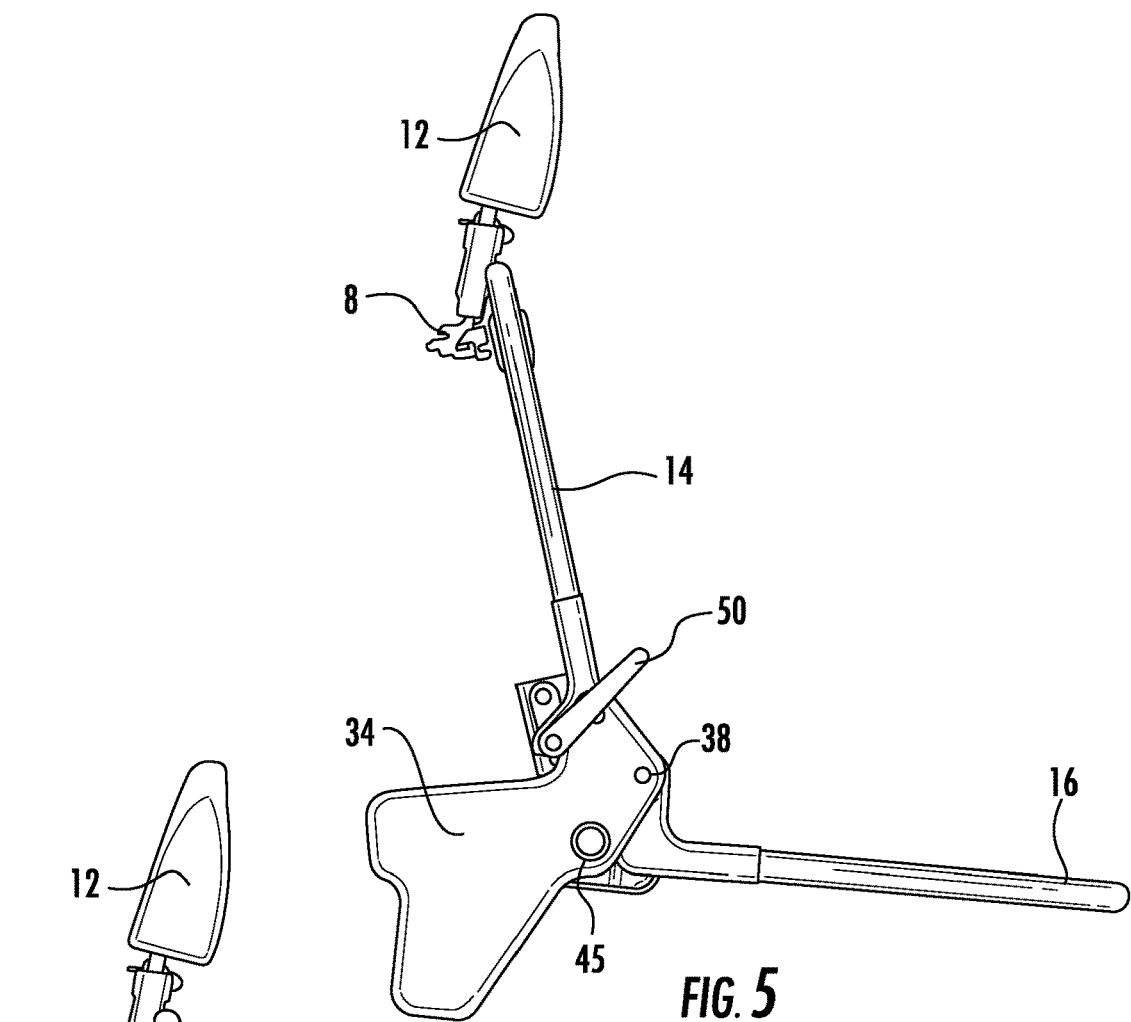
FIG. 5 is a side view showing the right side of the vehicle seat according to FIG. 1 with the seat back with a seat back subframe in the design position.

FIGS. 5 and 6 show the basic pivoting motion of the subframe 20 relative to the seat back frame 14. Based on the pivot connections 23, at seat back pivot brackets 24, the seat back subframe 20 may be moved relative to the seat back frame 14, about the upper subframe pivot 23 between a seat back subframe design position, a full rear position with the seat back subframe 20 aligned with the seat back frame 14 (FIG. 5) and a subframe slouch/recline position, a fully deployed recline position with the seat back subframe angled outwardly relative to the seat back frame (FIG. 6). This pivoting movement of the subframe 20 results in a changed angular state of the seat back as indicated by 14R in FIG. 6. In the slouch/recline position or the seat back recline state 14R, a lower edge of the seat back subframe 20 is positioned outwardly relative to the seat back frame 14 with the seat back subframe 20 pivoted to an angle relative to the seat back frame (see FIG. 6).

Figure 8:
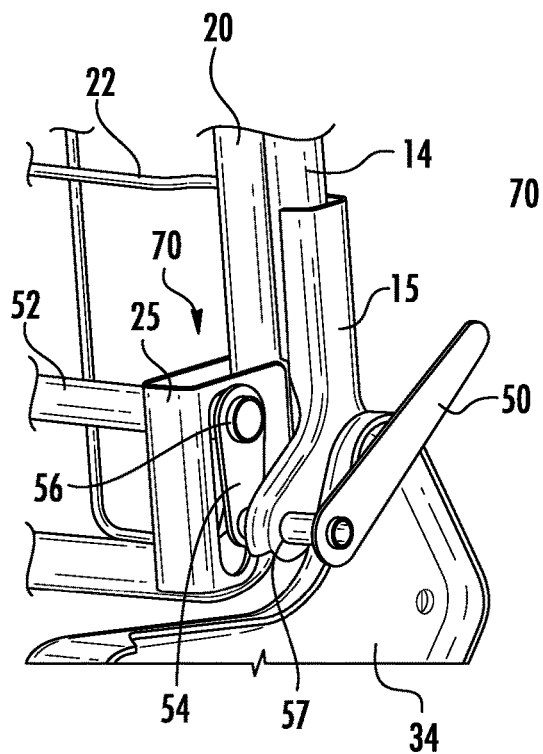
FIG. 8 is a perspective enlarged cutaway view showing an actuation assembly at a rear right side of the vehicle seat according to FIG. 1.
Figure 9:
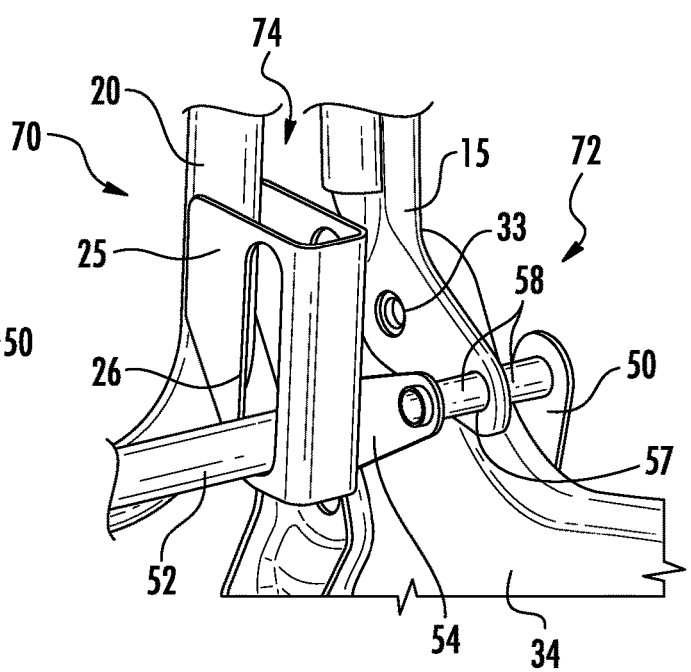
FIG. 9 is a perspective enlarged cutaway view showing the actuation assembly at the rear right side of the vehicle seat according to FIG. 1.

FIGS. 8 and 9 show aspects of an actuation assembly 70. The actuation assembly 70 pivotably moves the seat back subframe 20 relative to the seat back frame 14 about the upper subframe pivots 23, between the seat back subframe design position (FIGS. 5, 8 and 10) and the subframe slouch/recline position (FIGS. 6, 9 and 11). The actuation assembly 70 includes an actuator drive 72 and a drive to pivot transmission 74 (FIGS. 8, 9, 10 and 11). The actuator drive 72 provides a rotational actuation drive. The drive to pivot transmission 74 transmits the rotational drive of the actuator drive 72 into pivoting movement of the seat back subframe 20. The actuator drive 72 comprises an actuation lever 50 which can move from the initial position shown in FIGS. 5 and 8 to an actuated position as shown in FIGS. 6 and 9. The actuation lever 50 is fixed to a pivot shaft 58 which pivot shaft 58 rotates with actuation lever 50. The pivot shaft 58 is supported by a bushing/bearing 57 formed at an end of the seat back frame and bracket 15. An end of the pivot shaft 58, on an opposite side of the bearing 57 from the actuation lever 50, is fixed to a pivot lever 54. The pivot lever 54 is fixed to the pivot shaft 58 for rotation with the pivot shaft 58 and the for rotation with the actuation lever 50. As can best be seen in FIG. 8, a cam follower tube 52 is fixedly connected to the pivot lever 54 at connection 56. A seat back subframe cam bracket 25 is fixed to the seat back subframe 20. The seat back subframe cam bracket 25 defines a cam slot 26 (see FIG. 9). With the cam follower tube 52 fixed to the pivot lever 54 at connection 56, the cam follower tube 52 moves with the pivot lever 54 as the pivot lever 54 is rotated by the pivot shaft 58 and the actuation lever 50. This moves the cam follower tube 52 along an arcuate path with the cam follower tube 52 sliding along the cam slot 26. The arcuate path of movement of the cam follower tube 52 with the resulting rotation and sliding of the cam follower tube 52 within the slot 26, causes the seat back subframe cam bracket 25 with the subframe 20 to move outwardly relative to the seat back frame 14. As can be seen in FIGS. 8 and 9, the clockwise rotation of the actuation lever 50, from the position shown in FIG. 8 to the position shown in FIG. 9, causes the cam follower tube 52 to move along the arcuate path which includes moving downwardly and outwardly (e.g., forward as to a direction of travel). The downward movement moves the cam follower tube 52 along the extent of the cam slot 26. The outward movement causes the seat back subframe cam bracket 25 and the lower portion the seat back subframe 20 to move outwardly relative to the frame 14, causing the subframe 20 to pivot to an angle relative to the frame 14.

Figure 10:
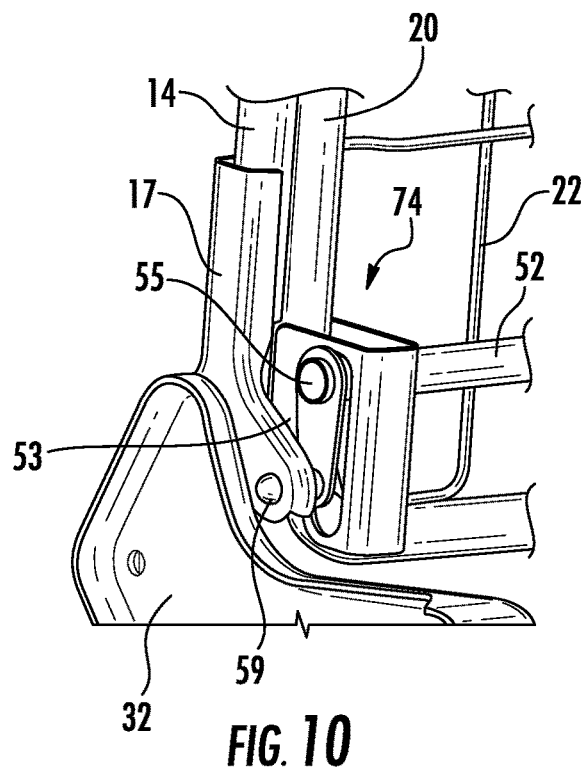
FIG. 10 is a perspective enlarged cutaway view showing the actuation assembly at the rear left side of the vehicle seat according to FIG. 1.
Figure 11:
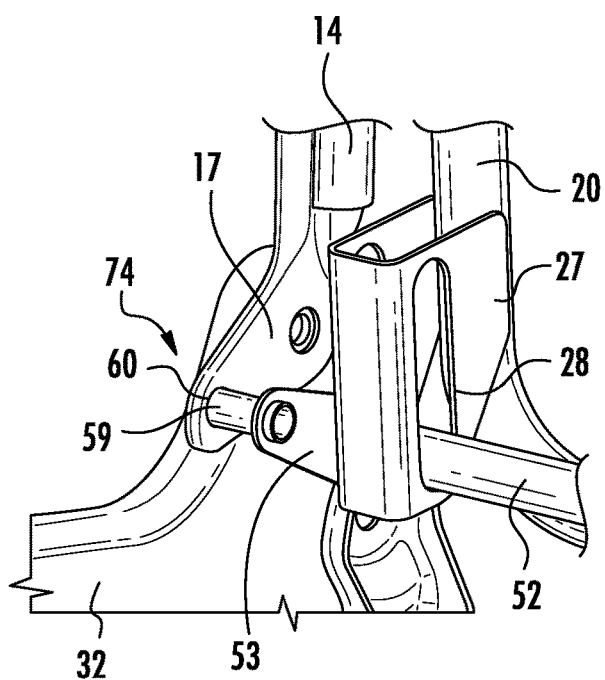
FIG. 11 is a perspective enlarged cutaway view showing the actuation assembly at the rear left side of the vehicle seat according to FIG. 1.

FIGS. 10 and 11 show the opposite left side of the drive to pivot transmission 74. The cam follower tube 52 moves along the arcuate path based on the movement of the pivot lever 54 and the actuation lever 50. The cam follower tube 52 is supported at the left side via a non-rotational connection 55 with the pivot 53 (FIG. 10). A pivot shaft 60 is non-rotationally connected to pivot 53. The pivot shaft 60 is rotatably supported by seat base pivot bracket 17 at a bushing/bearing 59. The arcuate movement of the cam follower tube 52, supported by the connection 55 to pivot lever 53, moves the associated seat back subframe cam bracket 27 as the cam follower tube 52 slides in the cam slot 28 of the seat back subframe cam bracket 27.

In the embodiment of FIGS. 1-11, no actuation drive is provided at the left side and no driving force is exerted at the left side. However, an actuation drive could be provided at each side. Although the lever actuation lever 50 is shown at the right side according to the embodiment of FIGS. 1 through 11, the two sides may be switched with the actuation lever 50 provided at the left side of the vehicle seat 10 and with the pivot transmission arrangement 74, without the actuator drive 72, provided at the right side of the vehicle seat 10.

This arrangement preferably provides two essential positions, namely the design position shown in FIGS. 8 and 10 and the slouch/recline position shown in FIGS. 9 and 11. The arrangement essentially moves toward one of the end two positions based on the cam follower tube 52 interacting with the cam slot 26 with the configuration shown and described. The arrangement is such that a movement 5° over (beyond) a center position, in either direction, will essentially move the cam follower tube 52 to one of the two end positions. However, an additional spring mechanism may be used to urge the arrangement into one of the two positions and avoid the cam follower tube 52 being maintained in a mid position. Even without the spring, the arrangement is essentially self locking, with the cam follower tube 52 assuming one of the two extreme (end) positions with any movement 5° over (beyond) the center position.

As an alternative to the embodiment discussed above, with the actuation lever 50 as the actuator drive 72, the actuation lever 50 may be replaced with a motor 65 providing the actuation drive 72. Further gearing/transmission may be provided between the motor 65 and the pivot shaft 58.

Figure 12:
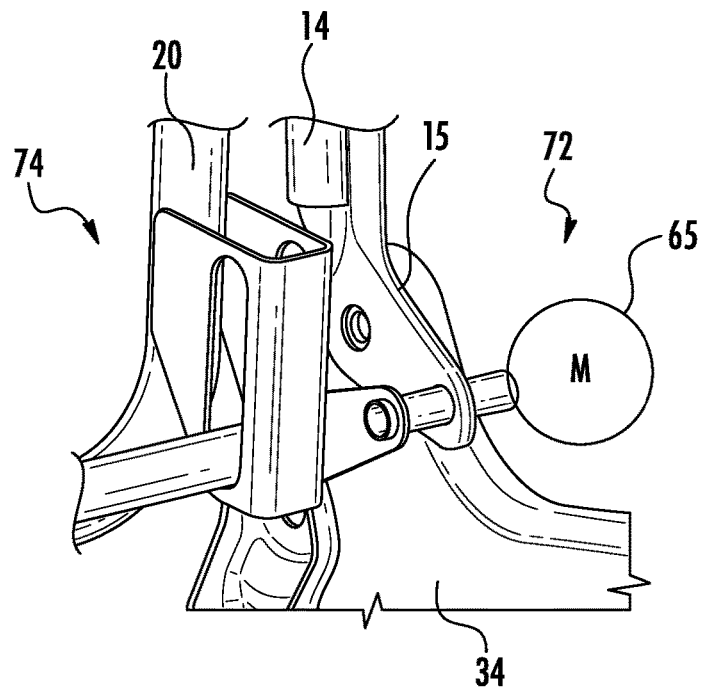
FIG. 12 is a perspective enlarged partially schematic cutaway view showing an actuation assembly at the rear right side of a vehicle seat according to another embodiment.

FIG. 12 shows an example in which the motor 65 is provided in place of the lever 50. The motor 65 may be driven in either direction between the design position and the slouch/recline position. Further, although the embodiment discussed above with reference to FIGS. 1 through 11 provides the pivot transmission arrangement 74 that assumes one of the two extreme positions, either the design position or the slouch/recline position, the use of the motor 65 may be such that any desired position may be maintained between the two extreme positions and the two extreme positions may also be maintained with a controlled rotation and stopping of the motor.

Figure 13:
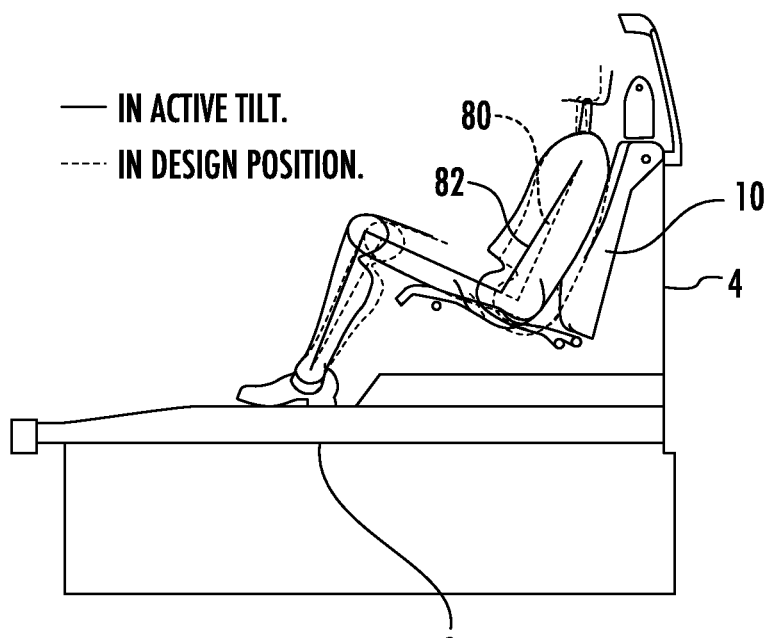
FIG. 13 is a side schematic view showing the position of the seat back of the vehicle seat according to FIG. 1 in both a design position and in a recline (active tilt) position and showing an occupant position in both the seat back design position and in the recline position and showing a vehicle body/bulkhead and vehicle floor.

FIG. 13 schematically shows the vehicle seat 10 relative to the vehicle floor 2 and the vehicle body/bulkhead 4. This shows the position of the occupant, showing the design position occupant back angle 80 with the seat back 14 in the design position and the position slouch/recline position occupant back angle 82 with the seat back 14 and the slouch/recline position.

Figure 14:
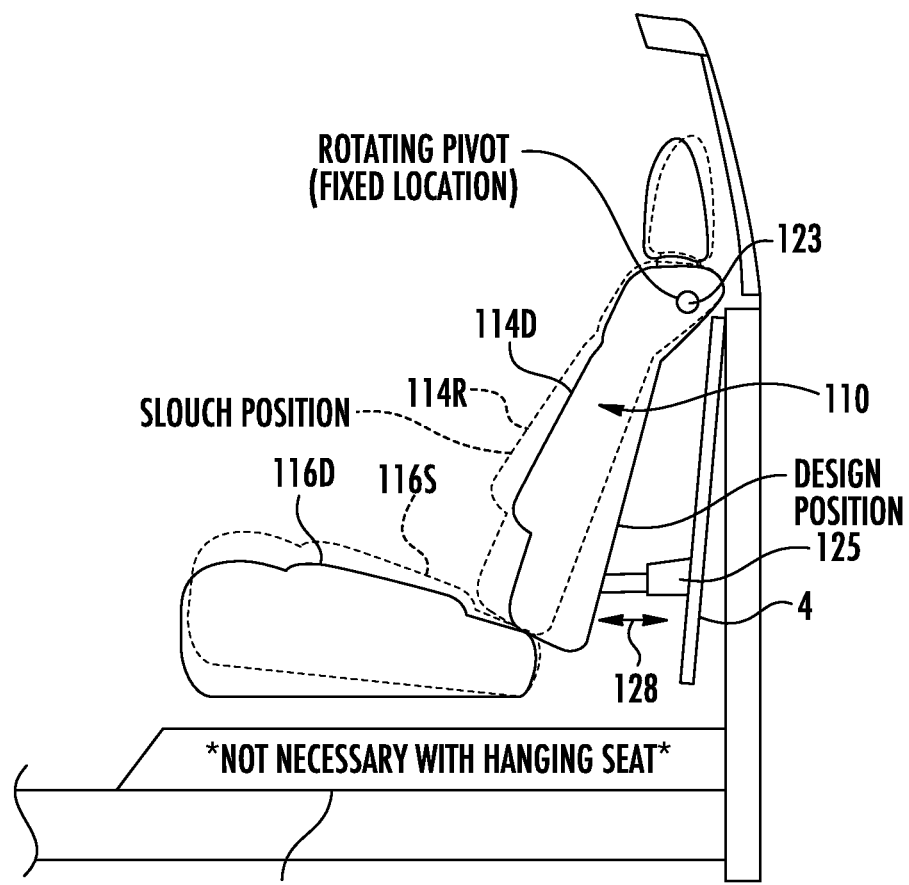
FIG. 14 is a side schematic view showing positions of the seat back and seat base of a vehicle seat according to a modified embodiment.

FIG. 14 shows a modified embodiment in which all or part of a vehicle seat 110 pivots about a fixed location rotating pivot 123. In practice the entire vehicle seat 110 may be supported at the pivot 123 or may be at least partially supported by other structural features. The support and movement may be provided by supporting and applying a pivoting force between the vehicle body/bulkhead 4 and the seat back 114 and/or the seat base 116 via a seat back actuation assembly 125 that can move the vehicle seat 110 back and forth along the directions 128. As an alternative, a motor may drive a pivot shaft of pivot 123, wherein the pivot shaft is rotationally fixed to the backrest 114 to move/pivot with the pivot shaft. According to the embodiment of FIG. 14, the seat back 114 and the seat base 116 pivot about the pivot 123. The pivot may be fixed to the bulkhead 4. As such, the seat base 116 may be moved (with a tilt and with a forward movement) from the design position 116D to the slouch/recline position 116S as the seat back moves from the design position 114D to the slouch/recline position 114S. This configuration provides very different support and movement features from the other embodiments. Further, with such a vehicle seat 110 hanging at pivot 123, there need not be any structural features under the seat base 116. This provides space under the seat base 116 with the seat base 116 pivoted down as shown. Further, this provides directly accessible floor space with the seat base 116 pivoted up to the stadium position.

FIGS. 15 and 16 schematically illustrate a modified vehicle seat 210. In FIG. 15, a seat back of the vehicle seat 210 is pivoted forward to the lie flat position, with a subframe 220 in the slouch/recline position 14RF. The features of the vehicle seat 210 are essentially the same as the vehicle seat 10 but the vehicle seat inner frame 220 may be positioned outwardly of the main seat back frame 214. The seat 210 is shown in FIGS. 15 and 16 in the slouch/recline position, such that the subframe 220 is pivoted out. With the seat back in the upright position, the pivoted out subframe 220, in the slouch/recline state, provides the slouch/recline function. With the seat back in the pivoted forward position and in the slouch/recline state with subframe 220 pivoted out relative to the seat back frame 214 (position 14RF), a back surface 86 (top facing with the seat back pivoted forward) of the seat back is disposed closer to a horizontal position than it would be without the seat back in the pivoted forward position and in the slouch/recline state. The back surface 86 of the seat back provides a raised load floor that is particularly useful as it is essentially horizontally disposed. A cargo strap 84 is provided that retracts at retractor 88 for stowage of the cargo strap 84 and can be used to secure items at the raised load floor 86.

FIG. 16 shows the seat back of the vehicle seat 210 in the upright position and in the slouch/recline state with the subframe 220 pivoted out relative to the seat back frame 14 to provide position 14R. The back surface 86 supports and/or at conceals the retractor 88 for stowage of the cargo strap 84. Any gap between the frame 214 and the subframe 220 may be covered with elastic trim or with pleated trim or with a gusset structure.

FIG. 17 shows the vehicle seat according to FIG. 1 with the seat back folded forward. Further, trim 140 is shown covering foam. The foam may be supported on the seat back support frame 22 of the subframe 20. The trim 140 covers both the frame 14 and the subframe 20. The trim 140 includes a trim elastic region or a gusset structure or an accordion pleated portion 142. The portion 142 allows for movement of the subframe 20 relative to the backrest frame 14 without forming a gap at the sides. In particular, the trim 140 is provided to allow an expansion of the structure so as to cover both the frame 14 and the subframe 20, both with the subframe 20 in the design position of subframe 20 and the in the slouch/recline position of the subframe 20.

In FIG. 17, the seat back is folded over forward in the slouch/recline position 14RF to provide a more horizontal (parallel to the vehicle floor) position. FIG. 17 also shows the seat back folded over forward in the design position 14DF. This illustrates that in this state (14DF) there is the greater angle relative to horizontal than in the folded over forward and slouch/recline state 14RF.

FIG. 18 schematically illustrates the disposition of the seat back folded forward both with the seat back in the design position 14DF and in the slouch/recline position 14RF. This shows the vehicle seat and the change of angle of the back surface 86 in the positions 14 DF and 14 RF, in which the back surface of the seat back is more nearly horizontal.

While specific embodiments of the invention have been shown and described in detail to illustrate the application of the principles of the invention, it will be understood that the invention may be embodied otherwise without departing from such principles.

LIST OF REFERENCE CHARACTERS 2 vehicle floor
4 vehicle body/bulkhead
8 body/bulkhead connection
10 vehicle seat
12 headrest
13 seat back frame end bracket
14 seat back frame
14DF seat back in design position pivoted forward
14RF seat back in slouch/recline position pivoted forward
14R seat back in slouch position (with the subframe in slouch position) you have
15 seat back frame end bracket
16 seat base frame
16 D seat base frame design position
16 S seat base frame
17 seat base pivot bracket
20 seat back subframe
22 seat back support frame
23 subframe pivot
24 seat back pivot bracket
25 seat back subframe cam bracket
26 cam slot
27 seat back subframe cam bracket
28 cam slot
30 floor engagement foot
31 left seat back pivot
32 left support bracket
33 right seat back pivot
34 right support bracket
35 left side vehicle body/bulkhead connection
36 left side seat base pivot
37 right side vehicle body/bulkhead connection
38 right side seat base pivot
39 floor engagement foot
44 horizontal support tube
45 tube and bracket support connection
50 actuation lever
52 cam follower bar
53 pivot lever
54 pivot lever
55 non-rotational connection
56 non-rotational connection
57 bushing/bearing
58 pivot shaft
59 bushing/bearing
60 pivot shaft
65 motor
70 actuation assembly
72 actuator drive
74 drive to pivot transmission
80 design position occupant back angle
82 slouch/recline position occupant back angle
84 cargo strap
86 load floor surface
88 strap retractor
110 modified vehicle seat
114D modified seat bask design position
114R modified seat back recline position
116D modified seat base design position
116R modified seat back recline position
123 upper seat back fixed pivot
125 seat back pivot actuation assembly
128 direction of movement
140 trim
142 trim elastic region/gusset/accordion pleated portion
210 modified vehicle seat
214 seat back frame
216 seat base
220 seat back subframe

What is claimed is:

1. A vehicle seat for a vehicle, the vehicle seat comprising:
a seat cushion frame;
a seat back frame with an upper subframe pivot adjacent to a seat back frame upper end and with a seat back frame lower end adjacent to the cushion frame;
a seat back subframe extending from a subframe upper end adjacent to the upper subframe pivot to a subframe lower end adjacent to the cushion frame, the seat back subframe being pivotably connected to the seat back frame at the upper subframe pivot for pivoting about the upper subframe pivot between a full rear position with the seat back subframe aligned with the seat back frame and a fully deployed recline position with the seat back subframe angled outwardly relative to the seat back frame; and
an actuation assembly pivotably moving the seat back subframe relative to the seat back frame about the upper subframe pivot between the full rear position and the fully deployed recline position, said actuation assembly comprising an actuation lever and a first end of a pivot lever both mounted on opposite ends of a pivot shaft, wherein said pivot shaft extends through a fixed seat back frame end bracket, wherein a second end of said pivot lever is mounted on a cam follower bar, said cam follower bar extends through a fixed first seat back subframe cam bracket on one side of said seat back subframe to a fixed second seat back subframe cam bracket on a second, opposite side of said seat back subframe.

2. A vehicle seat according to claim 1, further comprising a seat back attachment connection fixing the seat back frame to the vehicle.

3. A vehicle seat according to claim 2, wherein the seat back attachment connection comprises a bulkhead connection fixing the seat back frame upper end to a vehicle bulkhead, whereby the seat back frame is fixed at an angle relative to the vehicle bulkhead.

4. A vehicle seat according to claim 2, wherein the seat back attachment connection comprises bracket supports for connection of the vehicle seat to at least one of a vehicle bulkhead and a vehicle floor.

5. A vehicle seat according to claim 2, wherein the actuation assembly comprises an actuator drive and an actuator drive to seat back subframe pivot movement transmission transferring motion of the actuator drive to pivoting movement of the seat back subframe between the full rear position and the fully deployed recline position.

6. A vehicle seat according to claim 5, wherein the actuator drive to seat back subframe pivot movement transmission acts between the seat back frame and the seat back subframe at a location at or adjacent to the seat back frame lower end and at or adjacent to the seat back subframe lower end.

7. A vehicle seat according to claim 6, wherein:
the actuator drive comprises said actuation lever connected to the seat back subframe and rotatable about a drive axis;
the actuator drive to seat back subframe pivot transmission comprises:
said pivot lever connected to the seat back subframe and rotatable by the actuation lever about the drive axis;
a cam with a cam slot, the cam being connected to one of the pivot lever and the seat back subframe; and
a cam follower connected to another of the pivot lever and the seat back subframe, the cam follower moving along the cam slot between a cam design position and a cam subframe recline position, whereby the lower edge of the seat back subframe is moved outwardly relative to the seat back frame as the cam follower moving along the cam slot between a cam design position and a cam subframe recline position.

8. A vehicle seat according to claim 4, wherein the seat back frame is pivotably connected to a seat back pivot connection of the bracket supports for pivoting the seat back frame with the seat back subframe forward from a design position to a stowage or easy entry position.

9. A vehicle seat according to claim 1, wherein:
the seat back frame is pivotable forward with the subframe in the subframe fully deployed recline position, whereby the subframe is acted on by the seat base frame to position a load floor surface, comprised of a rear surface of the seat back in a load floor position;
the seat back frame is pivotable forward with the subframe in the subframe full rear position, whereby the subframe is acted on by the seat base frame to position the load floor surface in an angled position;

an angle of the load floor surface in the in a load floor position is changed relative to an angle of the load floor in the angled position.

10. A vehicle seat according to claim 4, wherein the seat back frame is pivotably connected to a seat back pivot connection of the bracket supports for pivoting the seat back frame, with the seat back subframe, rearward from a design position to a seat back frame recline position, whereby pivotably moving the seat back subframe relative to the seat back frame about the upper subframe pivot to the fully deployed recline position further changes a user recline position relative to the seat back frame recline position.

11. A vehicle seat according to claim 4, wherein the seat base frame is pivotably connected to the bracket supports for pivoting the seat base frame upward and rearward, from a design position to a stowage or stadium position.

12. A vehicle seat according to claim 4, wherein the bracket supports support the seat back frame with seat back subframe and the seat base frame at a vehicle floor.

13. A vehicle seat according to claim 4, wherein the bracket supports support the seat back frame with seat back subframe and the seat base frame at a vehicle bulkhead.

14. A vehicle seat according to claim 2, wherein the seat back frame is an outer frame with the seat back subframe disposed inwardly of the seat back frame.

15. A vehicle seat according to claim 14, wherein the seat back frame comprises a seat back tubular frame with first and second side seat back pivot brackets and the seat back subframe comprises a subframe tubular frame with subframe upper ends respectively connected to the first and second side seat back pivot brackets.

16. A vehicle seat according to claim 15, wherein:
the seat back tubular frame is U-shaped with an upper central portion connecting downwardly extending side portions, which terminate at respective seat back tube ends at the seat back frame lower end; and
the subframe tubular frame is U-shaped with a lower central portion connecting upwardly extending side portions, which terminate at the respective subframe tube ends at the subframe upper end.

17. A vehicle seat according to claim 16, wherein:
the seat back attachment connection comprises bracket supports for connection of the vehicle seat to at least one of a vehicle bulkhead and a vehicle floor;
each of the seat back tube ends is connected to a respective one of the bracket supports.

18. A vehicle seat according to claim 2, further comprising trim covering the seat back frame and the subframe, wherein the trim comprises an elastic portion, a gusset portion or a pleated portion to allow movement of the subframe relative to the seat back frame within the trim covering the seat back frame and the subframe.

19. A vehicle seat for a vehicle, the vehicle seat comprising:
a seat cushion frame;
a seat back frame with an upper subframe pivot adjacent to a seat back frame upper end and with a seat back frame lower end adjacent to the cushion frame;
a seat back subframe extending from a subframe upper end adjacent to the upper subframe pivot to a subframe lower end adjacent to the cushion frame, the seat back subframe being pivotably connected to the seat back frame at the upper subframe pivot for pivoting about the upper subframe pivot between a full rear position with the seat back subframe aligned with the seat back frame and a fully deployed recline position with the seat back subframe angled outwardly relative to the seat back frame;

an actuation assembly pivotably moving the seat back subframe relative to the seat back frame about the upper subframe pivot between the full rear position and the fully deployed recline position, the seat back frame is pivotable forward with the subframe in the subframe fully deployed recline position, whereby the subframe is acted on by the seat base frame to position a load floor surface, comprised of a rear surface of the seat back in a load floor position;

the seat back frame is pivotable forward with the subframe in the subframe full rear position, whereby the subframe is acted on by the seat base frame to position the load floor surface in an angled position;

an angle of the load floor surface in the in a load floor position is changed relative to an angle of the load floor in the angled position.

* * * * *